United States Patent
Cockle et al.

(10) Patent No.: US 8,984,864 B2
(45) Date of Patent: Mar. 24, 2015

(54) EXHAUST SYSTEM WITH A REFORMER CATALYST

(71) Applicant: Johnson Matthey Public Limited Company, London (GB)

(72) Inventors: Kirsty Ellen Cockle, Reading (GB); Paul James Millington, Reading (GB); Edward James Richard Moss, Reading (GB); John Frederick Pignon, Benson (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/172,083

(22) Filed: Feb. 4, 2014

(65) Prior Publication Data

US 2014/0216030 A1   Aug. 7, 2014

Related U.S. Application Data

(60) Provisional application No. 61/760,329, filed on Feb. 4, 2013.

(51) Int. Cl.
  *F01N 3/28* (2006.01)
  *F01N 5/02* (2006.01)
  (Continued)

(52) U.S. Cl.
  CPC *F01N 5/02* (2013.01); *F01N 3/101* (2013.01); *F01N 2240/02* (2013.01); *F01N 3/2053* (2013.01); *F02M 25/0755* (2013.01); *F02M 25/0726* (2013.01); *F01N 2240/20* (2013.01); *B01D 53/9445* (2013.01); *F01N 2240/30* (2013.01); *F01N 2610/03* (2013.01); *F01N 3/2828* (2013.01); *F01N 13/16* (2013.01); *F02B 37/00* (2013.01); *F02B 37/18* (2013.01); *F01N 3/02* (2013.01); *F01N 2330/06* (2013.01); *F01N 2370/02* (2013.01); *F01N 2370/04* (2013.01);
  (Continued)

(58) Field of Classification Search
  CPC ... F01N 3/101; F01N 3/2053; F01N 2240/02; F01N 2240/20; F01N 2240/30; F01N 2560/025; F01N 2560/14; F01N 2610/03; F02M 25/0726; F02M 25/0742; F02M 25/0755; Y02T 10/22
  USPC ........... 60/276, 279, 280, 286, 288, 299, 300, 60/303, 320, 324
  See application file for complete search history.

(56) References Cited

U.S. PATENT DOCUMENTS 6,887,455 B2   5/2005   Carpenter et al.
7,628,063 B2   12/2009   Yezerets
(Continued)

*Primary Examiner* — Thomas Denion
*Assistant Examiner* — Jorge Leon, Jr.
(74) *Attorney, Agent, or Firm* — Kevin M. Carroll

(57) ABSTRACT

An exhaust system for treating exhaust gas from an internal combustion engine is disclosed. The system comprises a three-way catalyst (TWC), a fuel reformer catalyst located downstream of the TWC, and a fuel supply means located upstream of the fuel reformer catalyst. The exhaust gas is split into two portions. The first portion of the exhaust gas bypasses the TWC and contacts the fuel reformer catalyst in the presence of fuel added from the fuel supply means, and is then recycled back to the engine intake. The second portion of the exhaust gas is contacted with the TWC and is then utilized to heat the fuel reformer catalyst before being expelled to atmosphere. The exhaust system allows for maximum heat exchange from the exhaust gas.

8 Claims, 2 Drawing Sheets

(51) Int. Cl.
  *F01N 3/10*    (2006.01)
  *F01N 3/20*    (2006.01)
  *B01D 53/94*   (2006.01)
  *F01N 13/16*   (2010.01)
  *F02B 37/00*   (2006.01)
  *F02B 37/18*   (2006.01)
  *F01N 3/02*    (2006.01)
  *F01N 13/00*   (2010.01)
  *F02D 19/06*   (2006.01)
  *F02M 25/07*   (2006.01)

(52) U.S. Cl.
  CPC ....... *F01N 2410/00* (2013.01); *F01N 2560/025* (2013.01); *F01N 2560/14* (2013.01); *F01N 13/009* (2014.06); *F02M 25/0718* (2013.01); *F02M 25/0727* (2013.01); *F02M 25/0742* (2013.01); *F02D 19/0671* (2013.01); *Y02C 20/10* (2013.01); *Y02T 10/36* (2013.01); *Y02T 10/121* (2013.01); *Y02T 10/144* (2013.01); *Y02T 10/16* (2013.01); *Y02T 10/22* (2013.01)
  USPC ................... 60/286; 60/276; 60/279; 60/280; 60/288; 60/300; 60/303; 60/320; 60/324

(56) References Cited

U.S. PATENT DOCUMENTS

| | | |
|---|---|---|
| 2002/0038542 A1 | 4/2002 | Akama et al. |
| 2003/0163988 A1 | 9/2003 | Kirwan et al. |
| 2010/0212611 A1 | 8/2010 | Yahagi |
| 2012/0117943 A1 | 5/2012 | Pignon |
| 2012/0291424 A1* | 11/2012 | Inuzuka et al. .................. 60/299 |

* cited by examiner

EXHAUST SYSTEM WITH A REFORMER CATALYST

FIELD OF THE INVENTION

The invention relates to an exhaust system for treating an exhaust gas from an internal combustion engine.

BACKGROUND OF THE INVENTION

Internal combustion engines produce exhaust gases containing a variety of pollutants, including hydrocarbons, carbon monoxide, nitrogen oxides, sulfur oxides, and particulate matter. Increasingly stringent national and regional legislation has lowered the amount of pollutants that can be emitted from such internal combustion engines. Many different techniques have been applied to exhaust systems to clean the exhaust gas before it is emitted to the atmosphere.

One proposed method for cleaning exhaust gases utilizes a catalytic reforming process. See for example SAE-07NAPLES-175 which teaches on board exhaust gas reforming of gasoline using a combined reformer and a three-way catalyst. U.S. Patent Application Publication No. 2012/0117943 also teaches an on board gas reforming system.

It is believed that a lower amount of emitted pollutants can be achieved by including hydrogen, from the catalytic reformer, in the fuel to the internal combustion engine. For instance, it has been suggested that diesel or gasoline fuel may be reformed to produce hydrogen, and that the hydrogen may be added back to the fuel fed to the engine in order to directly reduce $NO_x$ and particulate emissions from the engine. Further, there is also current interest in reforming because of the potential for recovery of energy (i.e., combustion heat) in the exhaust by conversion of exhaust components into fuel components of higher calorific value ($H_2$ and CO). This could permit an increase in overall efficiency of a gasoline engine and an associated decrease in fuel consumption and a decrease in $CO_2$ emissions.

As with any automotive system and process, it is desirable to attain still further improvements in exhaust gas treatment systems, particularly those systems that utilize catalytic reforming. We have discovered a new exhaust system utilizing a fuel reformer catalyst.

SUMMARY OF THE INVENTION

The invention is an exhaust system for treating an exhaust gas from an internal combustion engine. The system comprises a three-way catalyst (TWC), a fuel reformer catalyst located downstream of the TWC, and a fuel supply means located upstream of the fuel reformer catalyst. The exhaust gas is split into two portions. The first portion bypasses the TWC and contacts the fuel reformer catalyst in the presence of fuel added from the fuel supply means, and is then recycled back to the engine intake. The second portion is contacted with the TWC, and is then utilized to heat the fuel reformer catalyst before being expelled to atmosphere. The invention leads to improved heat exchange (less heat loss) for better catalytic reforming.

DETAILED DESCRIPTION OF THE INVENTION

Figure 1:
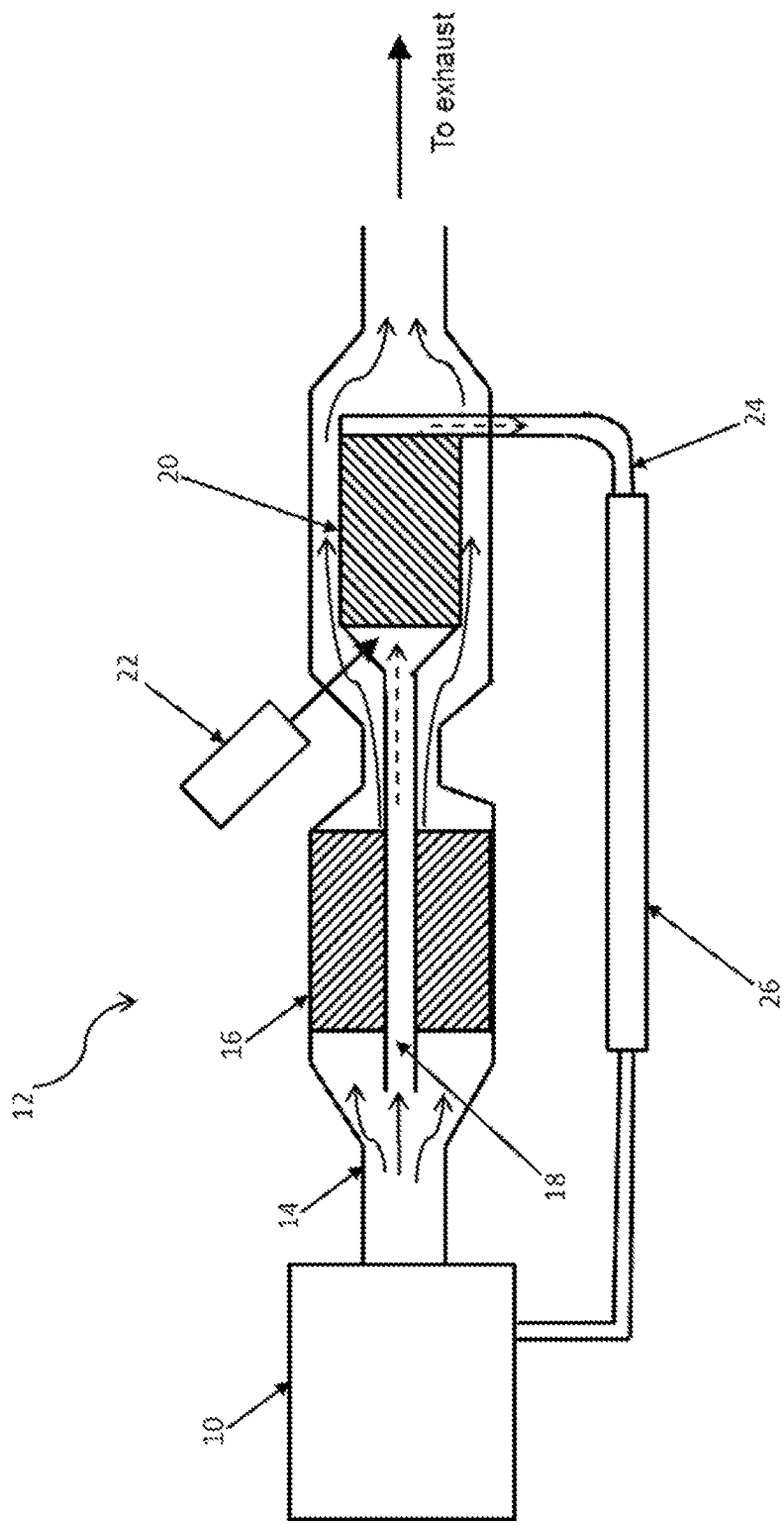
FIG. 1 is a schematic diagram of one embodiment of the invention.

The invention is an exhaust system for treating an exhaust gas from an internal combustion engine. The system comprises a three-way catalyst (TWC).

Three-way catalyst systems are well-known in the art. TWCs typically perform three main functions: (1) oxidation of CO to $CO_2$; (2) oxidation of unburned fuels to $CO_2$ and $H_2O$; and (3) reduction of $NO_x$ to $N_2$. A three-way catalyst preferably comprises one or more platinum group metals and one or more inorganic oxide supports. The platinum group metal (PGM) is preferably platinum, palladium, rhodium, or mixtures thereof.

The inorganic oxide supports most commonly include oxides of Groups 2, 3, 4, 5, 6, 13 and 14 and lanthanide elements. Useful inorganic oxide supports preferably have surface areas in the range 10 to 700 $m^2/g$, pore volumes in the range 0.1 to 4 mL/g, and pore diameters from about 10 to 1000 Angstroms. The inorganic oxide support is preferably alumina, silica, titania, zirconia, ceria, niobia, tantalum oxides, molybdenum oxides, tungsten oxides, or mixed oxides or composite oxides of any two or more thereof, e.g. silica-alumina, ceria-zirconia or alumina-ceria-zirconia. Alumina and ceria are particularly preferred. In addition to functioning as supports, a ceria-containing support, such as ceria ($CeO_2$) or a ceria-zirconia mixed, oxide may also function as an oxygen storage component (OSC) within the TWC. The inorganic oxide support may also be a zeolite, such as a beta zeolite, a ZSM zeolite, a ferrierite, or a chabazite The three-way catalyst is preferably coated on a substrate. The substrate is preferably a ceramic substrate or a metallic substrate; more preferably, the substrate is a metallic substrate for better heat exchange and ease of construction. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

The metallic substrate may be made of any suitable metal, and in particular heat-resistant metals and metal alloys such as titanium and stainless steel as well as ferritic alloys containing iron, nickel, chromium, and/or aluminum in addition to other trace metals.

The substrate may be a filter substrate or a flow-through substrate, and is most preferably a flow-through substrate, especially a honeycomb monolith. The substrate is typically designed to provide a number of channels through which vehicle exhaust passes. The surface of the channels is loaded with the three-way catalyst.

The three-way catalyst may be added to the substrate by any known means. For example, the inorganic oxide support or a PGM-containing support material may be applied and bonded to the substrate as a washcoat, in which a porous, high surface area layer is bonded to the surface of the substrate. The washcoat is typically applied to the substrate from a water-based slurry, then dried and calcined at high temperature. If only the inorganic oxide support is washcoated on the substrate, the PGM metal may be loaded onto the dried washcoat support layer (by impregnation, ion-exchange, or the like), then dried and calcined. Preferred loadings of PGM loaded onto a substrate are 0.02 to 1.7 g/liter (1 to 300 g/$ft^3$) catalyst volume.

The system of the invention further comprises a fuel reformer catalyst that is located downstream of the TWC. The fuel reformer catalyst is located so that it can utilize heat produced by the exothermic TWC reactions. Suitable fuel reformer catalysts include those capable of reforming fuels to form synthesis gas ($H_2$ and CO).

Preferred fuel reformer catalysts include catalysts based on platinum, palladium rhodium, nickel, and mixtures thereof. Preferably, the fuel reformer catalysts for use in the system of the invention include up to 5 wt. %, more preferably from 0.5 to 4 wt. % platinum, palladium, rhodium, and/or nickel dispersed on a refractory oxide support material, see, for example, U.S. Pat. No. 6,887,455, the teachings of which are incorporated herein by reference. Preferred catalysts include Rh catalysts comprising up to 3 wt. % Rh, Pt catalysts comprising up to 5 wt. % Pt, and Rh—Pt catalysts comprising up to 3 wt. % Rh and up to 5 wt. % Pt. Supports for the PGM and Ni-containing reformer catalysts include inorganic oxide supports most commonly include oxides of Groups 2, 3, 4, 5, 13 and 14 and lanthanide elements, particularly alumina, titania, ceria, zirconia, silica, silica-alumina and mixtures, and mixed oxides containing any two or more thereof. The fuel reformer catalyst is preferably in the form of a deposit on a conventional honeycomb substrate, desirably a metal honeycomb.

The system of the invention further comprises a fuel supply means that is located upstream of the fuel reformer catalyst. The fuel supply means adds fuel into the first portion of the exhaust gas that bypasses the TWC. Preferably, the fuel supply means is essentially identical to those used to inject fuel into the engine. The fuel supply means preferably comprises a fuel injector for injecting the fuel into exhaust gas immediately upstream of the fuel reformer catalyst. The fuel supply means is preferably controlled by a suitably programmed control means, optionally part of the engine control unit (ECU), with inputs including catalyst temperature and/or temperature of the gases entering and leaving the fuel reformer unit.

The fuel supply means is typically a fuel injector and preferably has a pump, or other suitable metering means, having the inlet side thereof connected to the fuel pump. The pump in turn is communicated with an injector which can be provided with one or more nozzles located upstream of the fuel reformer catalyst.

The fuel added to the first portion of the exhaust gas by the fuel supply means is preferably the same as the fuel used in the engine. The fuel is preferably a hydrocarbon (such as diesel or gasoline), but other fuels such as alcohols and ethers may also be utilized.

The exhaust system divides the exhaust gas from the internal combustion engine into two portions. The first portion of the exhaust gas bypasses the TWC, such that the first portion of exhaust gas does not contact the TWC catalytic material. Following the TWC bypass, the first portion is contacted with the fuel reformer catalyst along with fuel added from the fuel supply means to form a reformate gas stream. The reformate gas stream is then recycled back to the engine intake.

Preferably, a reformate cooler is located downstream of the fuel reformer catalyst, such that it is located between the fuel reformer catalyst and an intake to the engine. The reformate cooler lowers the temperature of the reformate gas stream prior to being added to the intake of the engine. The reformate cooler is preferably cooled by circulating engine coolant through a coolant line.

The first portion of the exhaust gas may be routed around the TWC and/or routed through the TWC prior to contacting the fuel reformer catalyst. By "routed through the TWC", it is meant that the first portion of the exhaust gas is passed through a space within the TWC without contacting the TWC catalytic material. By "routed around the TWC," it is preferably meant that the first portion is contacted with the outside of the TWC substrate without contacting the TWC catalytic material.

By routing the first portion of the exhaust gas through or around the TWC, the first portion will be heated by the TWC reaction exotherm prior to contacting the fuel reformer catalyst. The higher temperature gas contacting the fuel reformer catalyst will lead to a more efficient reforming reaction. Preferably, the first portion of the exhaust gas is less than half (preferably from 1 to 30% by volume, more preferably from 10 to 30% by volume) of the entire amount of exhaust gas.

The second portion of the exhaust gas is contacted with the TWC. Preferably, the second portion of the exhaust gas is a majority (preferably from 70 to 99% by volume, more preferably from 70 to 90% by volume) of the entire amount of exhaust gas. Upon contacting the TWC, heat is generated by the oxidation of CO to $CO_2$, the oxidation of unburnt fuels to $CO_2$ and $H_2O$, and the reduction of $NO_x$ to $N_2$ in the exhaust gas. The heated second portion of the exhaust gas is then utilized to heat the fuel reformer catalyst before being expelled to atmosphere. The exhaust system allows for maximum heat exchange from the exhaust gas, leading to an estimated 70-100° C. hotter reformer catalyst.

Preferably, the reformer catalyst is mounted in the exhaust system downstream of the TWC in order to increase heat exchange with the second portion of the exhaust gas. Preferably, the reformer catalyst may be located in an annular space in the exhaust system downstream of the TWC, such that the reformer catalyst is surrounded by an inner gas passage and an outer gas passage. The second portion of the exhaust gas flows through the inner and outer gas passages, in order to provide extra heat to the reformer.

In addition, since the first portion of the exhaust gas that bypasses the TWC will contain unreacted $O_2$, CO and $NO_R$, these gases can react on the fuel reformer catalyst generating an exotherm in the reformer. The exotherm can be used to assist reformer light-off and raise the temperature for warmed-up performance. The inventors have also shown that the $NO_x$ in the first portion of the exhaust gas that bypasses the TWC can also help activate the fuel for the catalytic reforming step.

Following contact with the fuel reformer catalyst, the reformate gas stream of the exhaust gas is recycled back to an intake of the engine. Preferably, the reformate gas stream is cooled prior to addition to the engine by means of a reformate cooler.

FIG. 1 shows one embodiment of the invention, showing a cross section of the apparatus. The apparatus comprises an engine 10 and an exhaust system 12. The exhaust system comprises a conduit 14 linking the engine to the TWC 16. In the conduit, a first portion of the exhaust gas from the engine passes through a bypass conduit 18 within the TWC to a fuel reformer catalyst 20. The first portion of the exhaust gas is heated by the TWC 16 by heat exchange, and reacts over the reformer catalyst 20 in the presence of added fuel from the fuel injector 22 to produce a reformate stream that is removed through a reformate recycle conduit 24 and recycled back to an intake of the engine 10. FIG. 1 also shows a preferable reformate cooler section 26 to cool the reformate prior to the reformate gas stream being added back to the engine intake. A second portion of the exhaust gas is contacted with the TWC 16 before being expelled to atmosphere. After passing over the TWC 16, the exhaust gas which has been heated by the exothermic oxidation reactions of the TWC system is passed over the fuel reformer catalyst 20 to heat the reformer catalyst by heat exchange prior to emitting to atmosphere.

Preferably, the exhaust system will also contain a first and second universal exhaust gas oxygen (UEGO) sensor. UEGO sensors are well known in the art. The UEGO sensor generates a signal whose magnitude is proportional to the oxygen level (and the air-fuel ratio) in the exhaust gases. In the presence of hydrogen, the UEGO sensors read richer due to faster diffusion of hydrogen (compared to CO) in the sensors. This "rich offset" can be used to determine the amount of hydrogen produced in the reformate gas, compared to the amount in the exhaust gas from the engine. Thus, the UEGO sensors allow for the measurement of hydrogen under reforming conditions, which is typically difficult since many hydrogen sensors will not work properly in the presence of CO, steam or at high temperature. UEGO sensors do work under these conditions.

The first UEGO sensor is located upstream of the TWC, such that it is contacted by the exhaust gas from the internal combustion engine. The second UEGO sensor is located downstream of the fuel reformer catalyst, such that it is contacted by the reformate gas stream that is recycled back to the engine intake. The difference between inlet and outlet UEGO sensors has been used to diagnose lean $NO_x$ trap activity for hydrogen generation during rich regeneration purges. See, for example, U.S. Pat. No. 7,628,063.

The exhaust system of the invention will preferably further comprise a turbocharger. Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the engine intake manifold. Turbines may be of a fixed or variable geometry type. Variable geometry turbines differ from fixed geometry turbines in that the size of the inlet passageway can be varied to optimize gas flow velocities over a range of mass flow rates so that the power output of the turbine can be varied to suit varying engine demands.

When used in the exhaust system of the invention, the turbocharger will be located downstream of the engine and upstream of the TWC. When a turbocharger is utilized, the second portion of the exhaust gas will be passed through the turbocharger prior to contacting the TWC. The first portion of the exhaust gas will preferably bypass the turbocharger, and will bypass the TWC, prior to contacting the fuel reformer catalyst. Because the exhaust gas prior to the turbocharger (pre-turbo gas) has a higher temperature and a lower pressure, and post-turbo gas has higher pressure and lower temperature, it is preferable that the first portion of the exhaust gas bypasses the turbocharger prior to contacting the reformer catalyst in order that the pressure of the first portion is not increased by the turbocharger and that the temperature is maintained as high as possible for the reforming reaction.

Figure 2:
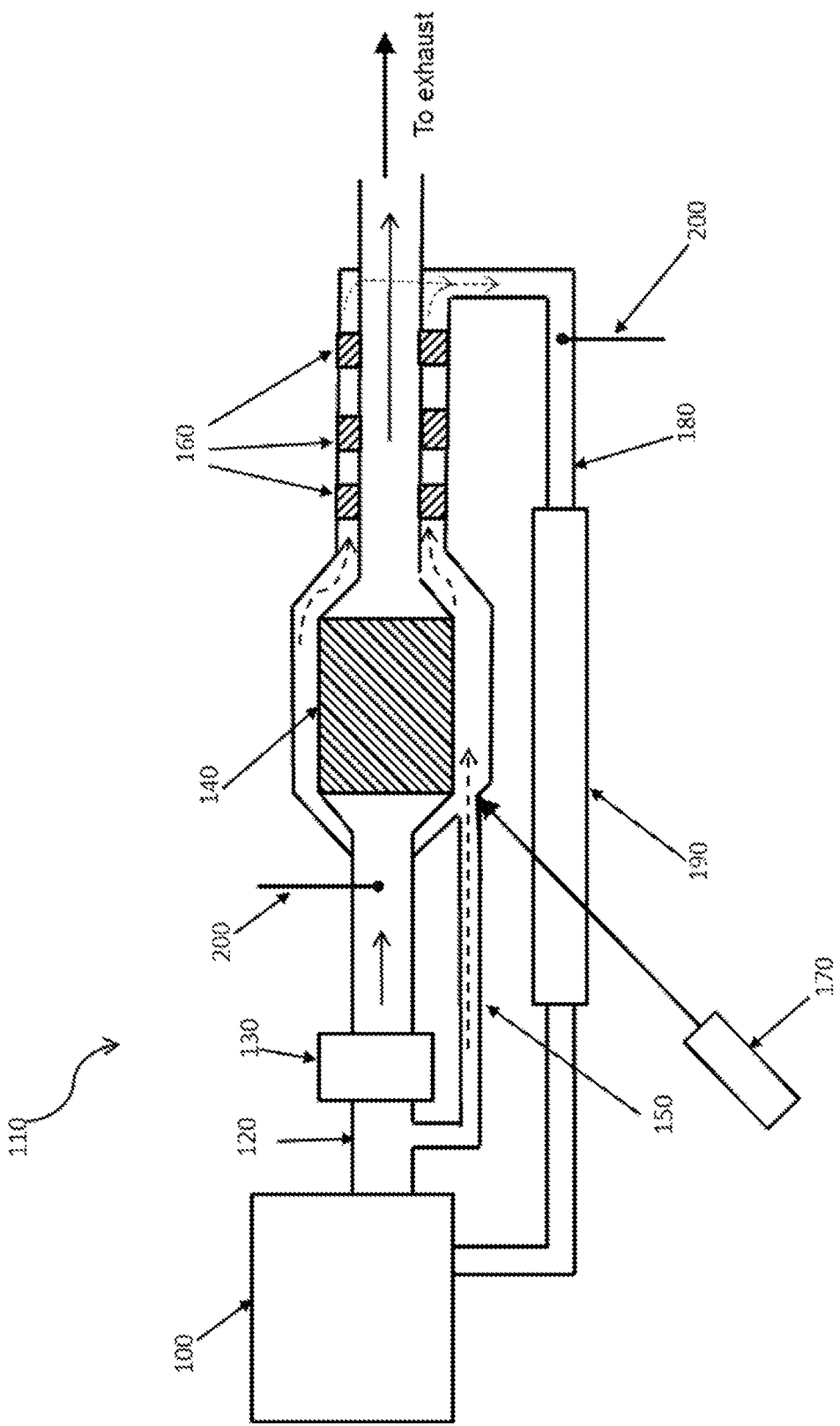
FIG. 2 is a schematic diagram of a second embodiment of the invention.

FIG. 2 shows a second embodiment of the invention, illustrating the addition of a turbocharger and the UEGO sensors. FIG. 2 shows a cross section of the apparatus. The apparatus comprises an engine 100 and an exhaust system 110. The exhaust system comprises a conduit 120 linking the engine to the TWC 140 and the exhaust, through a turbocharger 130. In the conduit, a first portion of the exhaust gas from the engine passes through a bypass conduit 150 that bypasses the turbocharger 130, and is passed to a fuel reformer catalyst 160. The reformer catalyst 160 is located in the annular space surrounding the conduit 120, in the portion of the conduit between the TWC and the emission of exhaust gas to atmosphere. Conduit 120 is an inner gas passage for the second portion of the exhaust gas, which helps to provide extra heat to the reformer catalyst 160. Although not illustrated, the reformer catalyst 160 can also be surrounded by an outer gas passage for the second portion of the exhaust gas, which also helps to provide extra heat to the reformer catalyst 160. The first portion of the exhaust gas flows around the TWC 140 and is heated by heat exchange with the TWC 140 prior to reacting over the reformer catalyst 160 in the presence of added fuel from the fuel injector 170 to produce a reformate stream. The reformate stream is then removed through a reformate recycle conduit 180 and recycled back to an intake of the engine 100. A reformate cooler section 190 may be utilized to cool the reformate prior to the reformate gas stream being added back to the engine intake. A second portion of the exhaust gas is passed through the turbocharger 130 and contacted with the TWC 140 before being expelled to atmosphere. The exothermic oxidation reactions of the TWC system result in a temperature increase in the second portion of the exhaust gas, and the heated second portion of the exhaust gas is then utilized to heat the fuel reformer catalyst 160 by heat exchange prior to being emitted to the atmosphere. UEGO sensors 200 are placed in conduit 120 upstream of TWC 140 and in reformate recycle conduit 180 to indicate the amount of hydrogen generated by the reformer catalyst, as described above.

The following examples merely illustrate the invention. Those skilled in the art will recognize many variations that are within the spirit of the invention and scope of the claims.

Example 1

Catalytic Activity Tests Using a Pt—Rh Reformer Catalyst

A supported platinum-rhodium reforming catalyst, coated on a 600 cells/in$^2$ (93 cells/cm$^2$) monolith, is used in a series of furnace heated catalytic activity tests. Two exhaust gas compositions are tested to simulate the gas compositions in a post-TWC and pre-TWC gas mixture. The compositions of the post-TWC and the pre-TWC mixtures are summarized in Table 1. The post-TWC and pre-TWC gas compositions are mixed with varying amounts of isooctane (0.3, 0.5 and 0.8 vol % isooctane), and the gas mixtures are reacted over the reforming catalyst at temperatures ranging from 250° C. to 550° C.

The results are summarized at Table 2.

Example 2

Effect of NO on Hydrogen Production

The effect of NO on hydrogen production is studied using the procedure of Example 1, except the amount of isooctane was maintained at 5000 ppm and NO was added both gas compositions. The compositions of the post-TWC and the pre-TWC synthetic mixtures are summarized in Table 3.

The test results are summarized at Table 4.

The results demonstrate that using exhaust gas from the engine generates a significant amount of hydrogen gas in the reformer catalyst, when it is not first contacted with a three-way catalyst (see Table 2). The presence of NO in the exhaust gas shows a further increase in hydrogen generation (see Table 4). These results are particularly evident at temperatures below 550° C.

TABLE 1

Comparison of exhaust gas compositions tested.

| Species | Post-TWC Concentration (% vol.) | Pre-TWC Concentration (% vol.) |
|---|---|---|
| $N_2$ | Balance | Balance |
| $CO_2$ | 10 | 10 |
| $H_2O$ | 10 | 10 |
| CO | 0 | 2 |
| $O_2$ | 0 | 1 |
| $i\text{-}C_8H_{18}$ | 0.3, 0.5, 0.8 | 0.3, 0.5, 0.8 |

TABLE 2

Comparison of Pre- and Post-TWC Gas Feed on Hydrogen Production by a Reformer Catalyst

| Example # | Pre or Post-TWC | Isooctane (vol. %) | $H_2$ Produced (vol. %) at Varying Temperatures | | | |
|---|---|---|---|---|---|---|
| | | | 250° C. | 350° C. | 450° C. | 550° C. |
| 1A* | Post | 0.3 | 0 | 0.1 | 2.0 | 3.5 |
| 1B | Pre | 0.3 | 0.6 | 1.7 | 3.2 | 3.6 |
| 1C* | Post | 0.5 | 0 | 0.05 | 1.8 | 4.2 |
| 1D | Pre | 0.5 | 0.55 | 1.2 | 4.1 | 4.6 |
| 1E* | Post | 0.8 | 0 | 0.15 | 1.7 | 4.3 |
| 1F | Pre | 0.8 | 0.5 | 1.3 | 4.2 | 5.3 |

*Comparison Example

TABLE 3

Comparison of exhaust gas compositions tested.

| Species | Post-TWC Concentration (% vol.) | Pre-TWC Concentration (% vol.) |
|---|---|---|
| $N_2$ | Balance | Balance |
| $CO_2$ | 10 | 10 |
| $H_2O$ | 10 | 10 |
| CO | 0 | 2 |
| $O_2$ | 0 | 1 |
| NO | 0 or 1500 ppm | 0 or 1500 ppm |
| $i\text{-}C_8H_{18}$ | 5000 ppm | 5000 ppm |

TABLE 4

Effect of NO on Hydrogen Production by a Reformer Catalyst

| Example # | Pre or Post-TWC | NO (ppm) | $H_2$ Produced (vol. %) at Varying Temperatures | | | |
|---|---|---|---|---|---|---|
| | | | 250° C. | 350° C. | 450° C. | 550° C. |
| 2A* | Post | 0 | 0 | 0 | 1.8 | 4.1 |
| 2B* | Post | 1500 | 0 | 0.2 | 2.2 | 3.7 |
| 2C* | Pre | 0 | 0.5 | 1.2 | 4.1 | 4.6 |
| 2D | Pre | 1500 | 0.9 | 3.1 | 5.9 | 3.9 |

*Comparison Example

We claim:

1. An exhaust system for treating an exhaust gas from an internal combustion engine, comprising:
   (a) a three-way catalyst (TWC);
   (b) a fuel reformer catalyst located downstream of the TWC; and
   (c) a fuel supply means located upstream of the fuel reformer catalyst,
   wherein a first portion of the exhaust gas bypasses the TWC and contacts the fuel reformer catalyst in the presence of fuel added from the fuel supply, and a second portion of the exhaust gas is contacted with the TWC and is utilized to heat the fuel reformer catalyst before being expelled to atmosphere; and
   wherein the reformate gas stream is recycled back to an intake of the engine.

2. The exhaust system of claim 1 wherein the first portion of the exhaust gas is routed around the TWC prior to contacting the fuel reformer catalyst.

3. The exhaust system of claim 1 wherein the first portion of the exhaust gas is routed through the TWC prior to contacting the fuel reformer catalyst.

4. The exhaust system of claim 1 wherein the fuel reformer catalyst comprises a metal selected from the group consisting of platinum, palladium, rhodium, nickel, and mixtures thereof.

5. The exhaust system of claim 1 wherein the three-way catalyst comprises one or more platinum group metals and one or more inorganic oxide supports.

6. The exhaust system of claim 1 further comprising a reformate cooler located downstream of the fuel reformer catalyst, wherein the reformate cooler lowers the temperature of the reformate gas stream prior to being added to the intake of the engine.

7. The exhaust system of claim 1 further comprising: (1) a first UEGO sensor located upstream of the TWC, wherein the first UEGO sensor is contacted by the exhaust gas from the internal combustion engine; and (2) a second UEGO sensor located downstream of the fuel reformer catalyst, wherein the second UEGO sensor is contacted by the reformate gas stream that is recycled back to the intake of the engine.

8. The exhaust system of claim 1 further comprising a turbocharger that is located downstream of the engine and upstream of the TWC, wherein the second portion of the exhaust gas is passed through the turbocharger prior to contacting the TWC and the first portion of the exhaust gas bypasses the turbocharger and the TWC prior to contacting the fuel reformer catalyst.

* * * * *